(12) United States Patent
DeDona et al.

(10) Patent No.: US 8,167,262 B2
(45) Date of Patent: May 1, 2012

(54) POWER CONVERTER MOUNTING ASSEMBLIES

(75) Inventors: Matthew Roger DeDona, Northville, MI (US); William Damianov, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 677 days.

(21) Appl. No.: 12/351,831

(22) Filed: Jan. 10, 2009

(65) Prior Publication Data

US 2010/0177543 A1 Jul. 15, 2010

(51) Int. Cl.
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |
| H02K 5/00 | (2006.01) |

(52) U.S. Cl. ......................................... 248/674; 310/91
(58) Field of Classification Search .................. 248/200, 248/300, 674
See application file for complete search history.

(56) References Cited

U.S. PATENT DOCUMENTS

| 4,284,915 A | 8/1981 | Hagenlocher et al. |
| 5,890,728 A * | 4/1999 | Zilm .............................. 280/433 |
| 5,907,243 A | 5/1999 | Goras et al. |
| 6,018,201 A | 1/2000 | Mauney et al. |
| 6,201,722 B1 * | 3/2001 | Hutchins ........................ 363/144 |
| 6,209,836 B1 * | 4/2001 | Swanson ......................... 248/300 |
| 6,336,815 B1 * | 1/2002 | Bestul et al. ..................... 439/66 |
| 6,679,213 B2 | 1/2004 | Kurita |
| 7,051,825 B2 * | 5/2006 | Masui et al. .................. 180/68.5 |
| 7,056,161 B2 | 6/2006 | Delcourt et al. |
| 7,538,448 B2 * | 5/2009 | Yoshida et al. ................. 307/9.1 |
| 7,735,785 B2 * | 6/2010 | Wippler et al. ............... 248/27.1 |
| 7,886,861 B2 * | 2/2011 | Nozaki et al. .................. 180/232 |
| 7,896,115 B2 * | 3/2011 | Ono et al. ................... 180/65.31 |
| 8,037,960 B2 * | 10/2011 | Kiya ............................. 180/68.5 |
| 2006/0211287 A1 * | 9/2006 | Kikuchi et al. ................ 439/157 |
| 2007/0228756 A1 * | 10/2007 | Wells ............................ 296/24.4 |
| 2007/0257173 A1 * | 11/2007 | Russell ....................... 248/276.1 |
| 2007/0285864 A1 * | 12/2007 | Yoshida et al. ............... 361/93.1 |
| 2008/0062622 A1 * | 3/2008 | Fukazu et al. ................. 361/678 |
| 2008/0078603 A1 * | 4/2008 | Taji et al. ....................... 180/312 |
| 2008/0185489 A1 * | 8/2008 | Ehrgott ........................ 248/224.7 |
| 2008/0236964 A1 * | 10/2008 | Kikuchi et al. ................ 188/162 |
| 2009/0095557 A1 * | 4/2009 | Yajima ........................... 180/312 |
| 2009/0302179 A1 * | 12/2009 | Krause et al. .................. 248/201 |

FOREIGN PATENT DOCUMENTS

JP 2006121825 A * 5/2006

OTHER PUBLICATIONS

Dr. Timothy Lipman et al., Hybrid Electric and Fuel Cell Vehicle Technological Innovation, IEV Symposium, Nov. 15, 2003, 26 pages. Martin O'Hara, Electrostatic Discharge Testing for Automotive Applications, conformity.com/artman/publish/printer_148.shtml, Feb. 1, 2007, 10 pages.

* cited by examiner

*Primary Examiner* — Lisa Lea Edmonds
*Assistant Examiner* — Xanthia C Cunningham
(74) *Attorney, Agent, or Firm* — Just Intellectuals, PLLC; David B. Kelley; Kristy J. Downing

(57) ABSTRACT

The present disclosure relates mounting assemblies for a vehicle DC-to-DC power converter. The mounting assemblies can include a bracket having a first end configured to be fastened to a DC-to-DC power converter housing and a second end configured to be fastened to a vehicle structural member. The mounting assemblies can be utilized in hybrid, fuel cell and/or electric vehicles.

20 Claims, 6 Drawing Sheets

POWER CONVERTER MOUNTING ASSEMBLIES

TECHNICAL FIELD

The present disclosure relates to mounting assemblies and electrical connectors for power converters. These teachings can be utilized in hybrid, fuel cell and/or electric vehicles.

BACKGROUND

Most contemporary automobiles include electrical power systems for supplying electricity to various vehicle systems (e.g., the starter, radio or entertainment center). Power systems include a battery and a power converter/alternator that converts electrical power generated by the vehicle's primary power source. For example, with automobiles having internal combustion engines, alternators can be attached to the engine and the rotational energy from the engine crankshaft can be harvested into electrical power. In this way, the alternator acts as a traditional generator.

In some arrangements, alternators are mounted to the vehicle engine and grounded through the vehicle chassis. A return current path to the alternator travels through grounding cables or wires that extend from the engine block to the chassis. This configuration has several detrimental effects. Not only do the use of grounding cables increase the overall part costs of the power system but they can lead to significant power losses throughout the system. The return current circuit path through cables contains resistance which causes voltage drops. The voltage drops represent wasted energy and may affect vehicular loads due to reduced voltage levels.

Some contemporary alternators elevate voltage outputs in order to compensate for voltage drops. E.g., some alternators use higher voltage batteries such as a 12V battery to compensate for losses in the return current circuit paths utilizing cables. In other vehicles, e.g., some hybrid electric vehicles, grounding cables and structures are used to facilitate return currents. These solutions, however, suffer from excessive voltage drop and loss of energy as well.

Therefore, it is desirable to have a mounting/grounding assembly for a power converter that enables the converter to be efficiently grounded to the vehicle chassis. It is further desirable to provide a corrosion resistant mounting assembly for the power converter. It would also be beneficial to have a mounting assembly that can be utilized in hybrid, fuel cell and/or electric vehicles.

SUMMARY

According to one exemplary embodiment, a vehicle DC-to-DC power converter mounting assembly includes: a bracket having a first end fastened to a converter housing and a second end fastened to a vehicle structural member. The bracket and vehicle structural member are electrically conductive thereby enabling the power converter to be grounded via the bracket.

According to another exemplary embodiment, a DC-to-DC power converter assembly includes: a vehicle DC-to-DC power converter configured to be attached to a vehicle engine; and a bracket having a first end fastened to the DC-to-DC power converter and a second end attached to a vehicle structural member. The bracket and vehicle structural member are electrically conductive thereby enabling the power converter to be grounded via the bracket.

According to another exemplary embodiment, a process of grounding a vehicle DC-to-DC power converter includes: providing an electrically conductive vehicle chassis; providing an electrically conductive mounting assembly; placing the mounting assembly between the DC-to-DC power converter and vehicle chassis; attaching the DC-to-DC power converter to the electrically conductive mounting assembly in a manner to enable electrical current to pass therethrough; and attaching the DC-to-DC power converter to the vehicle chassis through the mounting assembly in a manner to enable electrical current to pass therethrough.

One of the advantages of the present invention is that it enables power converters to be efficiently grounded via the vehicle chassis (e.g., a vehicle frame rail). In one embodiment, the invention yields 90% efficiency. The present invention can be utilized in hybrid, fuel cell and/or electric vehicles.

Another advantage of the present invention is that it increases the ease of assembly and installation of the power converter. Grounding cables are eliminated from the assembly. In one embodiment, a locating pin is included at one end of the bracket. The locating pin assists an assembler in positioning the mounting assembly with respect to the vehicle chassis.

Another advantage of the present invention is that the mounting assembly can be coated in an electrically conductive material to enhance the conductivity of the assembly. This reduces the voltage drop and power losses through the return current circuit channel. In one embodiment, the mounting assembly is also coated with a corrosion resistant material.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Figure 1:
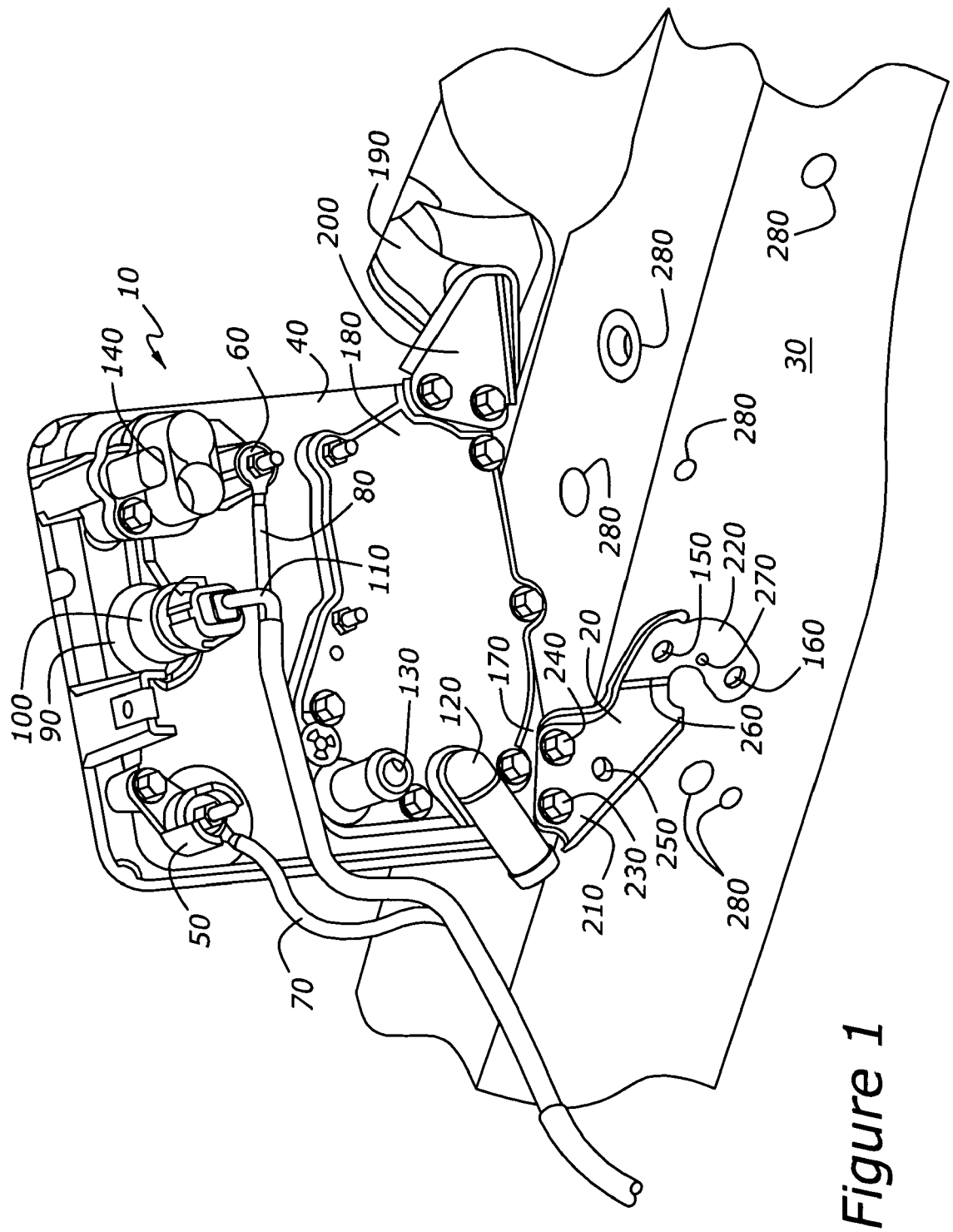
FIG. 1 is a perspective view of a vehicle power converter attached to a vehicle structural member according to an exemplary embodiment of the present invention.

Referring to the drawings, FIGS. 1-9, wherein like characters represent the same or corresponding parts throughout the several views there is shown a DC-to-DC power converter 10 for use in internal combustion engine, hybrid, fuel cell and/or electric vehicles. The power converter 10 is configured to be mounted and primarily grounded to a vehicle structural member (e.g., a vehicle frame rail of the chassis) through a mounting assembly, e.g., bracket 20 as shown in FIG. 1. The mounting assemblies enable the power converter 10 to be more efficiently grounded.

With reference to FIG. 1, there is shown therein a perspective view of a vehicle DC-to-DC power converter 10 attached to a vehicle structural member 30. In the shown embodiment, the vehicle structural member 30 is a frame rail of a vehicle chassis. FIG. 1 shows the DC-to-DC power converter as it would be installed in a vehicle.

The power converter 10 is a DC-to-DC, high voltage power converter. The converter 10 is configured to power down the current received from an electric power source through a high voltage power distribution box (or "HV PDB"). The electric power source can be, for example, a generator or battery pack such as a Li-ion or NiMH power pack. High voltages ranging from 150V-350V DC can travel through the converter 10. The primary function of the converter 10 is to convert high voltage DC power to low voltage DC power in order to chare a starting, lighting and ignition (or "SLI") battery and support vehicle low voltage loads. Power converter 10 converts a predetermined input voltage to a regulated output voltage (e.g., 14.5 V at 21° C.), while supplying a load current of up to 125 amps. In one embodiment, power converter 10 incorporates controller area network (or "CAN") software based communication signals which contain: (i) command signals from a separate system control module, (ii) output signals made available via CAN to other modules communicating on the same system communication bus, and/or (iii) output appropriate diagnostic messages for service and problem troubleshooting. In the shown embodiment, power converter 10 is liquid cooled. Power converter 10 is configured to limit current output as a function of liquid coolant temperature. Power converter 10 can be configured to protect itself from overload, short circuit, over-voltage, under voltage, and over-temperature conditions.

Power converter 10, as shown in FIG. 1, includes a converter housing 40. The housing 40 includes a B+ terminal 50 and a B− terminal 60. Terminals 50, 60 provide power to the 12 volt or SLI battery system. Cables 70, 80 extend from the B+ and B− terminals 50, 60 respectively. Power converter housing 40 also includes a control terminal 90 to connect the converter 10 to a vehicle control unit (not shown). The vehicle control unit governs the performance of the converter. In one embodiment, the vehicle control unit is in communication with an engine control unit and the power converter 10 is governed according to engine performance. In another embodiment, the vehicle control unit is in communication with a control module for the battery power pack. The power converter 10 is controlled according to the performance level of the battery power pack. Control terminal 90 is connected to the vehicle control unit through a control signal connector 100. Control signal connector 100 is wired to the vehicle control unit via a cable 110 that extends therefrom.

Power converter housing 40 also includes an inlet and outlet 120, 130 respectively. Inlet and outlet are used to provide coolant to the internal power converter components. Inlet 120 is covered with an L-shaped nozzle. In the shown embodiment, the L-shaped nozzle is positioned at an angle of approximately 30° with respect to the bottom edge of the converter 10. Another terminal 140 is also included in the power converter housing. Terminal 140 is a high voltage connector. Terminal 140 is an inlet source of energy for the power converter 10.

The power converter 10 is attached to the vehicle structural member 30 through the mounting assembly or bracket 20. Bracket 20 is a pinch fastener joint and includes two orifices 150, 160 through which screws or fasteners can be fitted. Bracket 20 attaches to the power converter housing 40 at one end 170. At another end 180 of the converter housing, the converter 10 is attached to a vehicle structural member 190 using bracket 200.

Bracket 20 includes two ends 210, 220. The first end 170 is configured to be fastened or attached to the converter housing 40 via fasteners 230, 240. The first end 210 also includes an orifice 250 to reduce the material costs and weight of the bracket 20. Bracket 20 includes a bend 260 so that the first end 210 of bracket is angularly positioned with respect to the second end 220 of the bracket (as is discussed in detail with respect to FIG. 4).

The second end 220 of the bracket 20 is configured to be fastened to the vehicle structural member 30. The bracket 20 and vehicle structural member 30 are electrically conductive. The second end 220 is crescent shaped. The second end 220 includes two orifices 150, 160 through which fasteners can fit. A locating pin 270 is included in the second end 220 of the bracket 20 between orifices 150, 160 (which is further discussed with respect to FIG. 6).

With further reference to FIG. 1, the converter 10 is located in a front portion of the vehicle or under the hood. In the shown embodiment, the power converter 10 is attachable to the vehicle structural member 30. Vehicle structural member 30 is a frame rail of the vehicle chassis that is interconnected to a front bumper of the vehicle. In the illustrated embodiment, the vehicle structural member 30 is hollow and composed of steel. Vehicle structural member 30 includes a series of orifices 280 for attaching other components and/or reducing material costs and weight.

Vehicle structural member 30 and bracket 20 are coated with an electrically conductive material. The material also is corrosion resistant. The coating can be applied at various thicknesses levels. In the shown embodiment, the vehicle structural member 30 and bracket 20 are coated with a film of material 2 mm thick. In other embodiments, the vehicle structural member 30 and bracket 20 are coated in a film that is less than 1.5 mm thick. The coating material is composed of a nickel zinc alloy. In another embodiment, the coating material is composed of a tin zinc alloy. In another embodiments, the coating material can be composed of any number of corrosion resistant and/or electrically conductive materials including, but not limited to: inorganic tri-chromium platings, Cobalt (ii) Nitrate (or $Co(NO3)2$—e.g., in volumes of 10-12%), Chromium (iii) chloride (or $CrCl3$—e.g., in volumes of 12-14%) and titanium. Bracket is coated using an electrolysis coating (or "e-coating") procedure. Exemplary e-coating procedures are disclosed in U.S. Pat. No. 7,014,749 titled "Electrolytic Deposition of Coatings for Prosthetic Metals and Alloys" filed on Dec. 27, 2001, which is herein incorporated by reference in its entirety.

Figure 2:
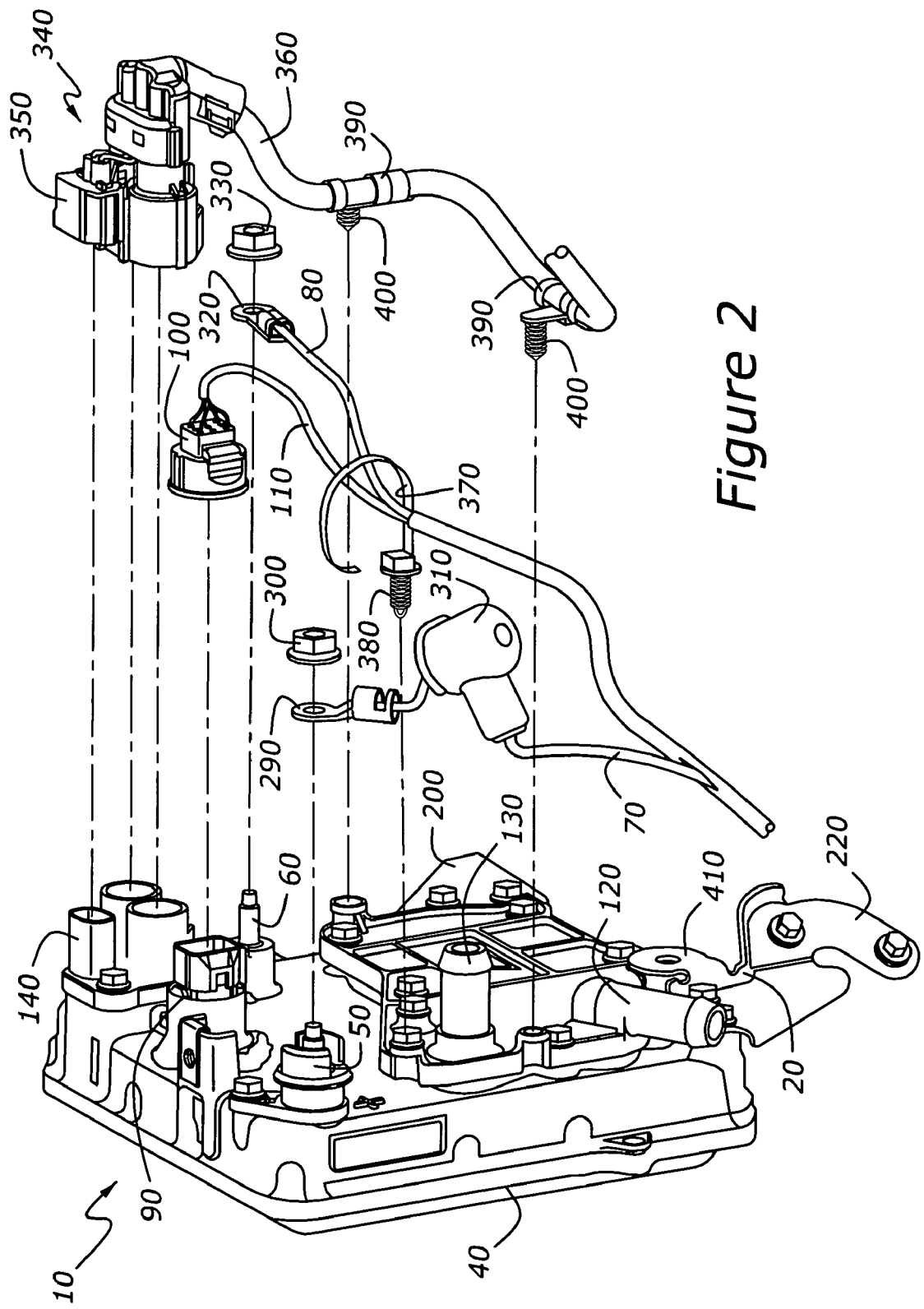
FIG. 2 is a partial exploded view the vehicle power converter of FIG. 1 with connectors disassembled.

FIG. 2 illustrates a partial exploded view showing electrical connectors attached to the DC-to-DC power converter 10 of FIG. 1. The B+ terminal 50 includes a connector 290 wired to cable 70. Connector 290 is secured to B+ terminal 50 via a fastener 300. In the shown embodiment, the fastener 300 is a nut. A cap 310 is provided for covering the B+ terminal 50. A connector 320 attaches to the B− terminal 60. Connector 320 is wired to cable 80 and is secured to the B-terminal via fastener 330. Another wire assembly 340 is included in the assembly, as shown in FIG. 2. Wire assembly 340 includes a connector 350 that attaches to output terminal 140. A cable 360 extends from the connector 350.

Cables 80, 110 and 360 can be attached to power converter housing 40 via fasteners. Cables 80 and 110 are attached to converter housing 40 using a wire harness 370. Wire harness 370 is attached to fastener 380 which is a screw in this embodiment. Cable 360 is attached to converter housing 40 via wire harnesses 390. A fastener 400 is attached to wire harness 390. Fastener 400 is a screw that attaches to the converter housing 40.

Bracket 20 is configured not to interfere with the connectors and cables extending from the converter housing 40. Bracket 20 is located at one corner of the converter housing 40. A disc 410 is formed in the bracket 20. Disc 410 includes an orifice 420. The disc 410 is a mechanical fastener for a hose retention strap. In one embodiment, a coolant degassing hose (not shown) is routed near the power converter 10. The hose requires tension to prevent chaffing. A retention strap (not shown) has a push pin that can be composed of a hard plastic, for example, which attaches to the hole at the center of disc 410.

Figure 3:
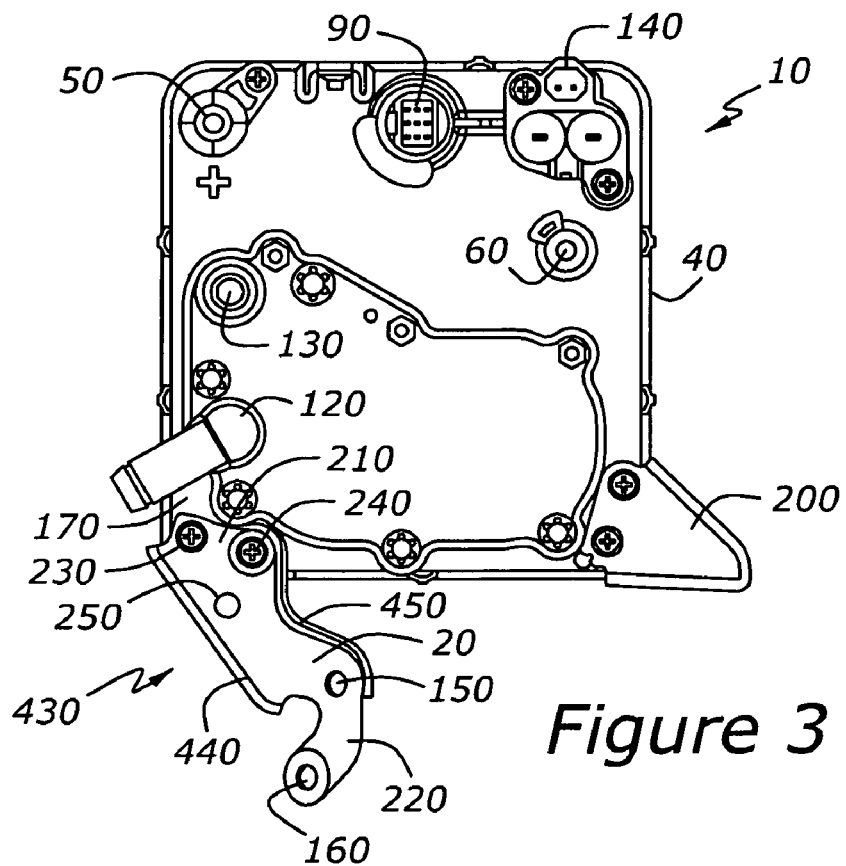
FIG. 3 is a side view of the vehicle power converter of FIG. 1.

Referring now to FIG. 3, a front view of the DC-to-DC power converter 10 of FIG. 1 is shown. At one corner of the converter is the B+ terminal 50. The B+ terminal 50 is configured to receive power from the vehicle's primary power source. At another corner of the power converter 10 is the B− terminal 60.

Attached to another corner of the power converter housing 40 is the mounting assembly 430 for the converter housing. The mounting assembly 430 includes the bracket 20 which is shown attached to housing at end 170. Two fasteners 230, 240 are used to fasten the bracket 20 to the converter housing 40. Fasteners 230, 240 are electrically conductive. Power converter 10 can be partially grounded through fasteners 230, 240. The second end 220 of the bracket 20 is angularly positioned with respect to the converter housing 40. In this way, the converter housing 40 can be positioned at an angle with respect to the second end 220 of the bracket 20. At the second end 220 of the bracket are two orifices 150, 160. The second end 220 is crescent shaped. First end 210 and second end 220 of bracket 20 includes a machined surface. The machined surfaces interface with the converter housing 40 and the vehicle structural member (e.g., the frame rail 30 shown in FIG. 1). Machined surfaces increase the conductivity of the bracket 20.

Figure 4:
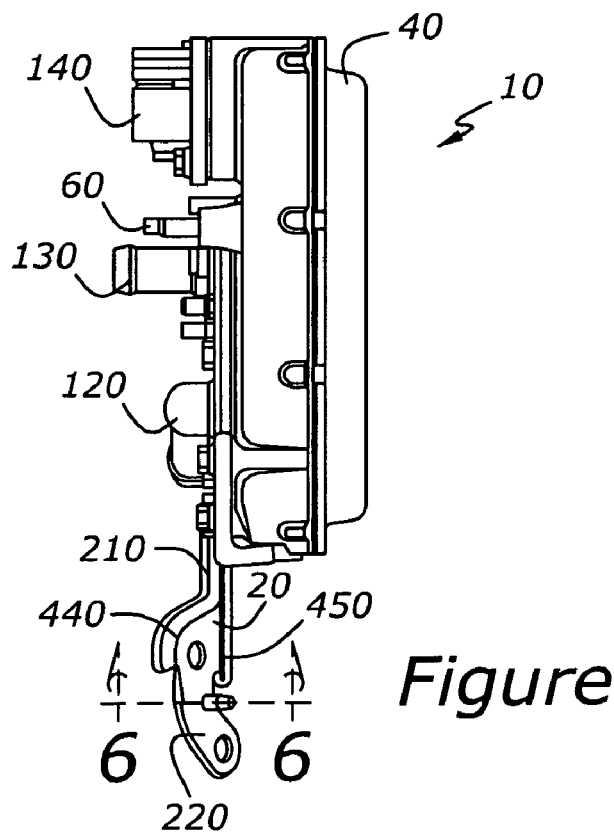
FIG. 4 is a side view of the vehicle power converter of FIG. 1.

FIG. 4 illustrates a side view of the converter housing 40 and mounting bracket 20. The position of the second end 220 of the bracket 20 with respect to the first end 210 and converter housing 40 is highlighted in FIG. 4. The second end 220 is positioned at an angle with respect to the first end 210 of the bracket 20. In the shown embodiment, the first end 210 is positioned approximately at an angle of 30° with respect to the second end 220 of the bracket 20. The angular position of the first end 210 with respect to the second end 220 assists in positioning the converter housing 40. The bend 260 (as shown in FIG. 1) of the bracket 20 can be smaller or larger than 30°. In one embodiment, the first end 210 is positioned at an angle of 90° with respect to the second end 220 of the bracket 20.

The first and second ends 210, 220 of the bracket 20 further include edges 440, 450 (or lips) that are configured to increase the stiffness of the bracket. The edge 450 is formed in the second end 220 of the bracket and has a bend with a radius of curvature of approximately 90°. Edge 440 is in the first end 210 of the bracket 20 and includes a bend with a radius of curvature of approximately 90°.

Figure 5:
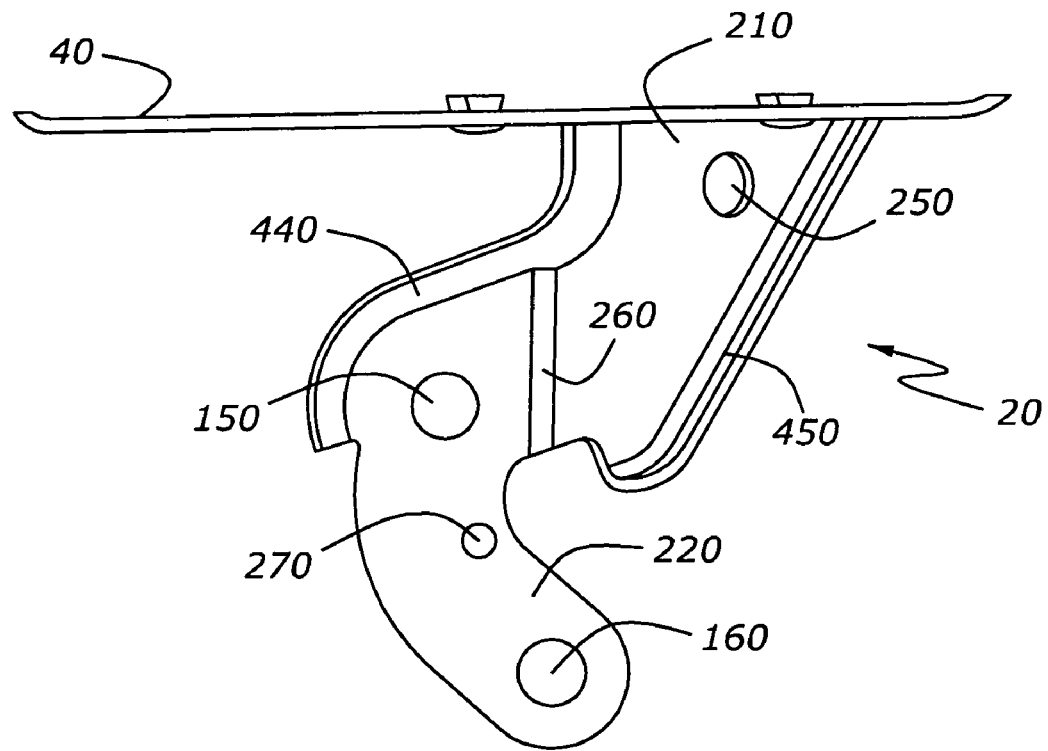
FIG. 5 is a side view of a mounting assembly shown in FIG. 4.

FIG. 5 is a side view of the bracket 20 cut away from the converter housing 40. The illustration is from the opposite side of the bracket 20 as the view in FIG. 4. The crescent shape of the second end 220 is also illustrated in FIG. 5. Orifices 150, 160 are oval shaped and similar to slots. This shape increases the ease of assembly or attachment of the bracket 20 to a vehicle structural member. Orifices 150, 160 are less sensitive to design tolerances. The size of the orifices 150, 160 can be reduced to increase conductivity between the bracket 20 and vehicle structural member. In another embodiment, only one fastener is utilized to attach the bracket 20 to the vehicle structural member. In another embodiment, three fasteners are used to attach the bracket 20 to the vehicle structural member.

Figure 6:
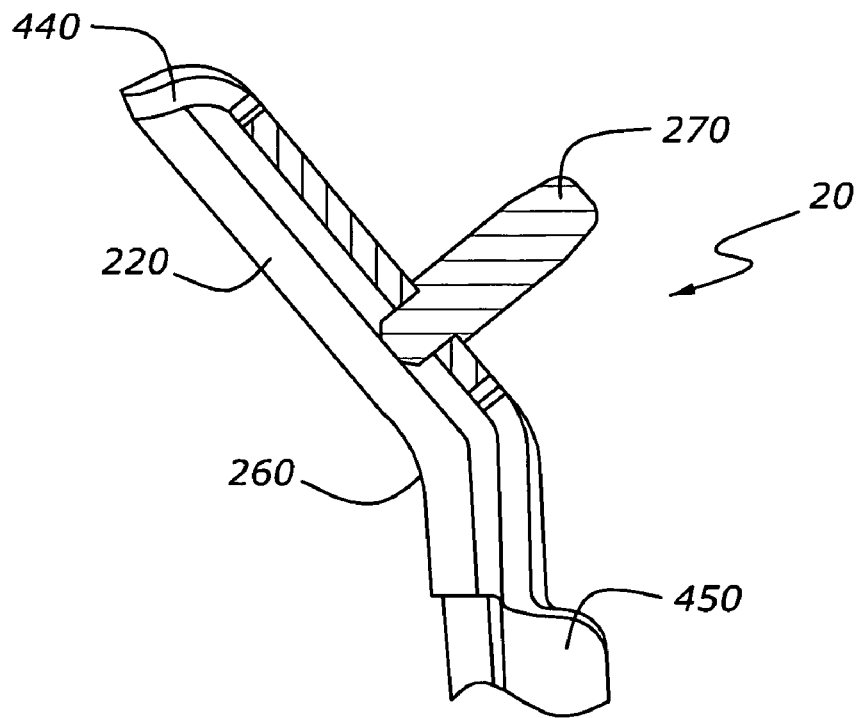
FIG. 6 is a cross-section view of the mounting assembly of FIG. 4 along section 6-6.

A locating pin 270 extends from the second end 220, as shown with respect to FIG. 6. The cross-section is through the bracket 20 at Section 6-6 of FIG. 5. The locating pin 270 is a cylindrical member. The pin 270 is solid and can be composed of the same material as the bracket 20. In the shown embodiment, the pin 270 is composed of steel and formed with the bracket. Pin 270 can be attached to the bracket 20, welded or otherwise affixed thereto. Other locating devices can be utilized including, but not limited to, visual aids, electrical, mechanical features or other poke-a-yokes.

Figure 7:
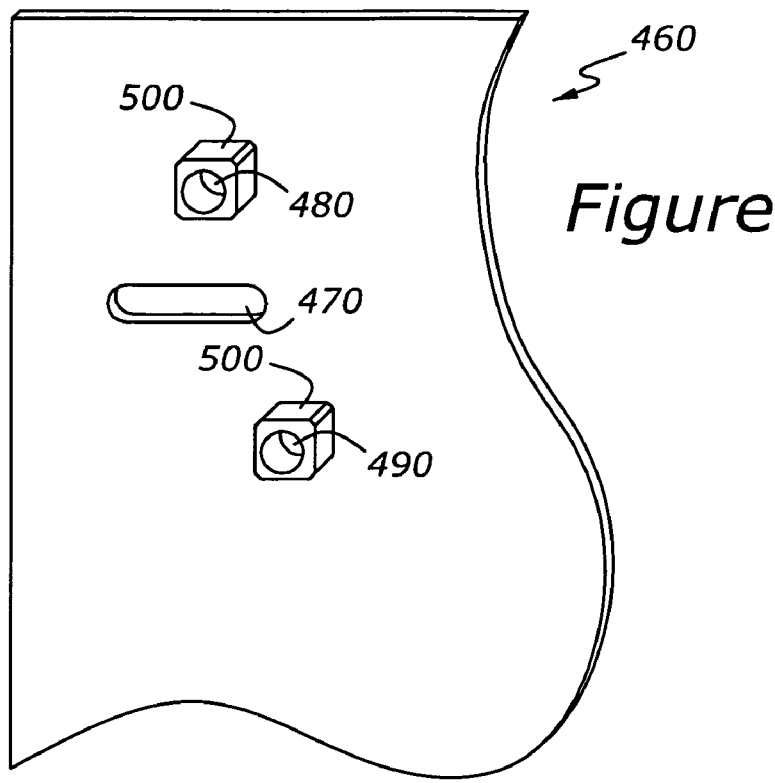
FIG. 7 is a partial side view of a vehicle structural member according to an exemplary embodiment of the present invention.

A partial cut-away of a vehicular structural member 460 is shown in FIG. 7. Vehicle structural member 460 includes a receiving member (or slot) 470 configured to mate with a locator on the mounting assembly (e.g., locating pin 270). The pin 270 and slot 470 assist in aligning the bracket 20 and vehicle structural member 460. In the shown embodiment, the pin 270 and slot 470 assist in positioning the bracket at the proper height with respect to the vehicle structural member 460. The vehicle structural member 460 includes two orifices 480, 490 configured to receive fasteners. Orifices 480, 490 are configured to align with orifices 150 and 160 in the bracket 20 (as shown in FIG. 1). The slot 470 is positioned between the two orifices 480, 490 in the vehicle structural member 460. Orifices 480, 490 are covered by threadless weld nuts 500. The nuts 500 are electrically conductive and attached to the vehicle structural member 460. Power converters can at least partially be grounded through nuts 500. Nuts 500 can be welded to the vehicle structure 460 or attached using other techniques known within the art (e.g., press fitting, gluing, or being formed with the frame rail). The nuts 500 do not include traditional threads. When a fastener, such as a screw, is driven into the orifices 480, 490 it drills threads into the nut 500. The electrical connection is strengthened by this method of connecting the nut 500 and fasteners.

Figure 8:
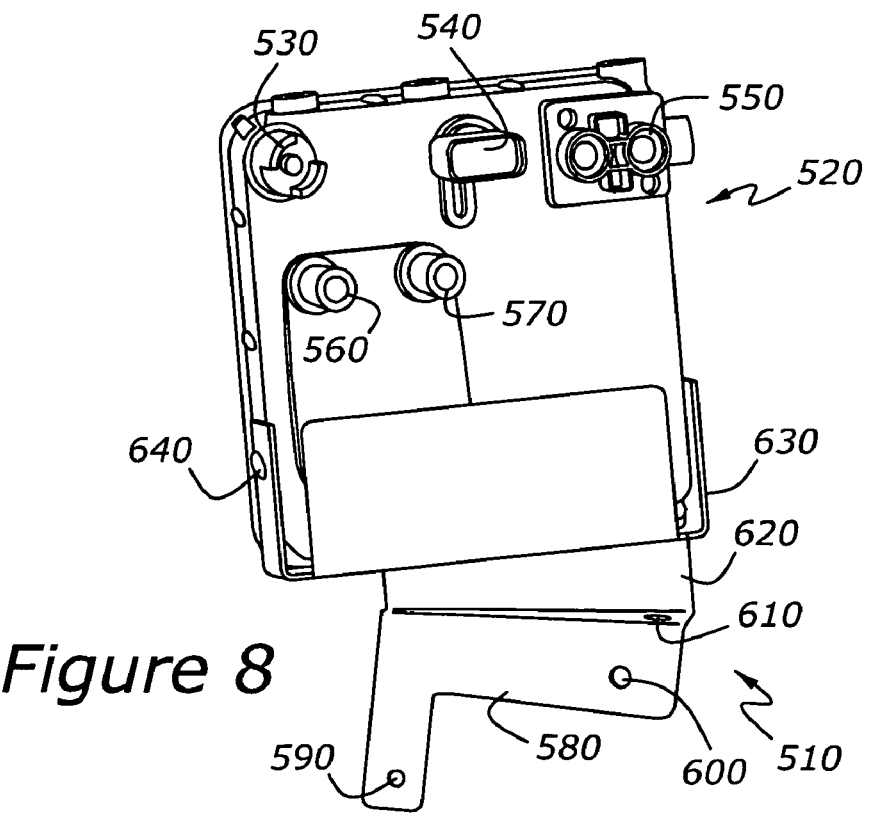
FIG. 8 is a side view of a converter with mounting assembly according to another exemplary embodiment.

FIG. 8 illustrates another embodiment of a mounting assembly 510. A power converter assembly 520 is mounted atop the mounting assembly 510. Power converter 520 is a DC-to-DC converter and includes a number of terminals 530, 540, and 550. Power converter 520 also includes an inlet and outlet 560 and 570, respectively.

The mounting assembly 510 includes an L-bracket 580. The bracket 580 includes at least three orifices 590, 600 and 610 through which fasteners can be fitted to attach the bracket 580 to a vehicle structural member. The bracket 580 has an accordion shape in the midsection 620 of the bracket. A U-shaped bracket 630 is attached to the power converter 520. The U-shaped bracket 630 prevents the converter 520 from moving. Fasteners 640 are included to attach the power converter 520 to the bracket 630. Bracket 630 is angled with respect to a vertical direction; accordingly power converter 520 will be angled with respect to the vehicle structural member when attached to the bracket 630.

The mounting assemblies discussed herein are not limited to bracket and fastener assemblies. In other embodiments, mounting assemblies include hinges, clamps, screws, bolts, or other fasteners known within the art. Brackets can be manufactured using a number of known techniques including but not limited to forming, stamping, molding, or extruding. Brackets are composed of an electrically conductive material, e.g., steel. In other embodiments, brackets can be composed of copper alloys, titanium or other materials.

Figure 9:
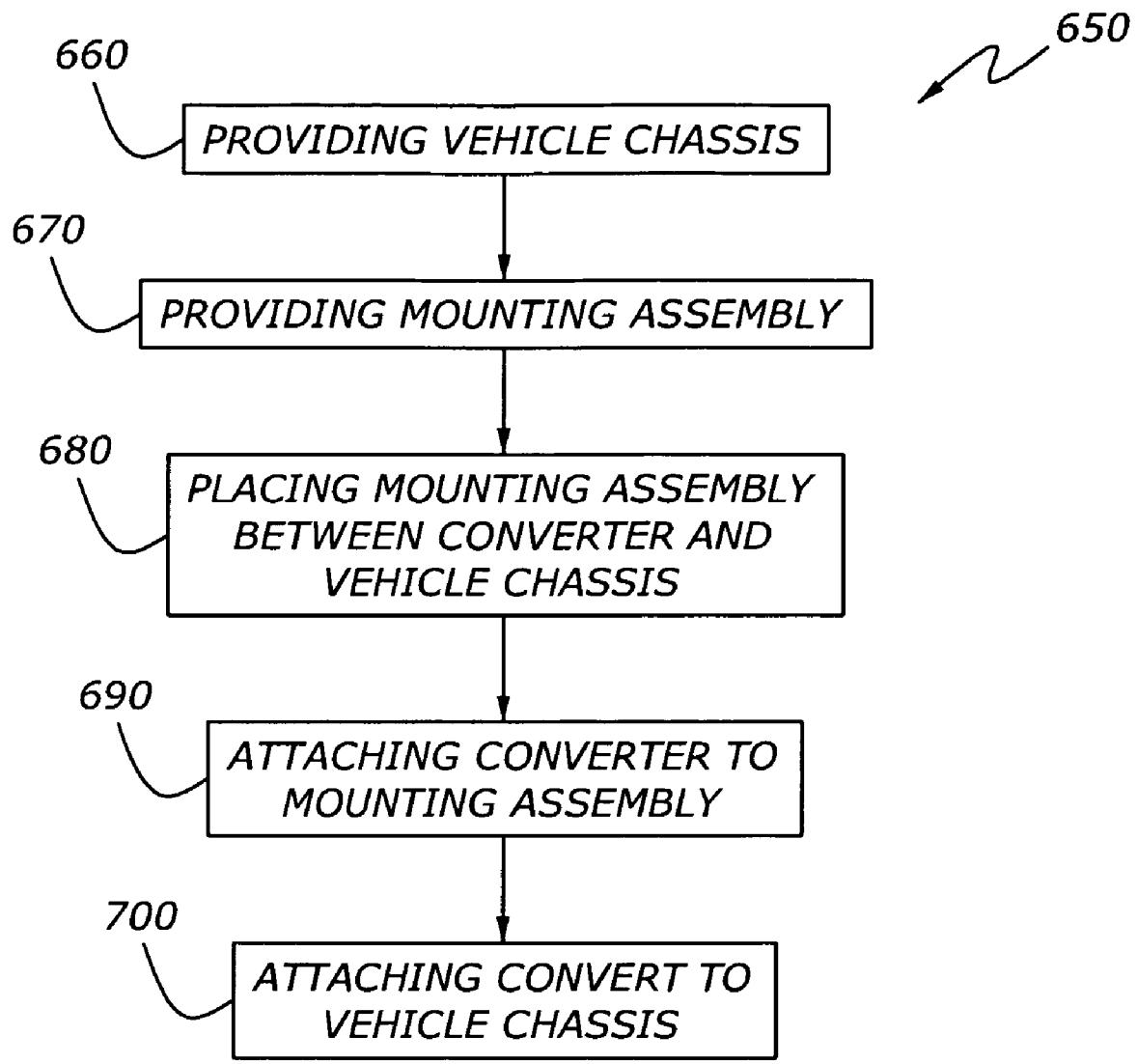
FIG. 9 is a flow chart of a process of grounding a vehicle power converter according to an exemplary embodiment of the present invention.

With reference to FIG. 9, there is shown a process 650 of grounding a vehicle converter according to an exemplary embodiment of the present invention. The process 650 includes several steps. First an assembler can provide an electrically conductive vehicle chassis 660. Process 650 further includes providing an electrically conductive mounting assembly 670 and placing the mounting assembly between the DC-to-DC power converter and vehicle chassis 680. Process 650 also includes attaching the DC-to-DC power converter to the mounting assembly in a manner to enable electrical current to pass therethrough 690. An assembler can attach the DC-to-DC power converter to the vehicle chassis through the mounting assembly in a manner to enable electrical current to pass therethrough 700. In one embodiment, the process further includes providing a locator to assist in aligning the mounting assembly with the vehicle chassis.

The invention has been described with reference to certain aspects. These aspects and features illustrated in the drawings can be employed alone or in combination. Modifications and alterations will occur to others upon a reading and understanding of this specification. Although the described aspects discuss mounting assemblies of several material constructions, it is understood that other materials can be used for selected components if so desired. It is understood that mere reversal of components that achieve substantially the same function and result are contemplated, e.g., providing a locater between the converter, mounting assembly and vehicle structural member can be accomplished using various configurations without departing from the present invention. It is intended to include all such modifications and alterations insofar as they come within the scope of the appended claims or the equivalents thereof. While several examples for carrying out the invention have been described, those familiar with the art to which this invention relates will recognize alternative designs and embodiments for practicing the invention. Thus, the above-described embodiments are intended to be illustrative of the invention, which may be modified within the scope of the following claims. Moreover, while the best modes for carrying out the invention have been described in detail, those familiar with the art to which this invention relates will recognize various alternative designs and embodiments for practicing the invention within the scope of the appended claims.

We claim:

1. A vehicle DC-to-DC power converter mounting assembly, comprising: a bracket having a first end fastened to a converter housing and a second end fastened to a vehicle structural member; wherein the bracket and vehicle structural member are electrically conductive thereby enabling the power converter to be grounded via the bracket.

2. The assembly of claim 1, wherein the bracket is a pinch fastener joint having the first end angularly positioned with respect to the second end.

3. The assembly of claim 1, further comprising: an electrically grounding fastener at the second end of the bracket.

4. The assembly of claim 3, wherein the electrically grounding fastener includes a threadless weld nut.

5. The assembly of claim 1, further comprising: a locating pin at the second end of the bracket; and a slot in the vehicle structural member configured to mate with the locating pin to assist in aligning the bracket and vehicle structural member.

6. The assembly of claim 1, wherein the bracket is coated in an electrically conductive material.

7. The assembly of claim 6, wherein the electrically conductive material comprises nickel and zinc.

8. The assembly of claim 6, wherein the electrically conductive material has a thickness of at least 1.5 millimeters.

9. The assembly of claim 1, wherein the bracket is coated in a corrosion resistant material.

10. The assembly of claim 1, wherein the bracket includes a machined surface.

11. The assembly of claim 1, wherein the bracket includes an edge configured to increase the stiffness of the bracket in the first end or second end.

12. A vehicle DC-to-DC power converter assembly, comprising: a DC-to-DC power converter; and a bracket having a first end fastened to the DC-to-DC power converter and a second end attached to a vehicle structural member; wherein the bracket and vehicle structural member are electrically conductive thereby enabling the power converter to be grounded via the bracket.

13. The assembly of claim 12, further comprising: an electrically grounding fastener at the second end of the bracket.

14. The assembly of claim 12, wherein the bracket is coated in an electrically conductive material.

15. The assembly of claim 14, wherein the electrically conductive material comprises nickel and zinc.

16. The assembly of claim 14, wherein the electrically conductive material has a thickness of at least 1.5 millimeters.

17. The assembly of claim 12, wherein the bracket is coated in a corrosion resistant material.

18. The assembly of claim 12, wherein the bracket includes an edge configured to increase the stiffness of the bracket in the first end or second end.

19. A process of grounding a vehicle DC-to-DC power converter, comprising: providing an electrically conductive vehicle chassis; providing an electrically conductive mounting assembly; placing the mounting assembly between the DC-to-DC power converter and vehicle chassis; attaching the DC-to-DC power converter to the electrically conductive mounting assembly in a manner to enable electrical current to pass therethrough; and attaching the DC-to-DC power converter to the vehicle chassis through the mounting assembly in a manner to enable electrical current to pass therethrough.

20. The process of claim 19, further comprising: providing a locator to assist in aligning the mounting assembly with the vehicle chassis.

* * * * *